Figure 1:
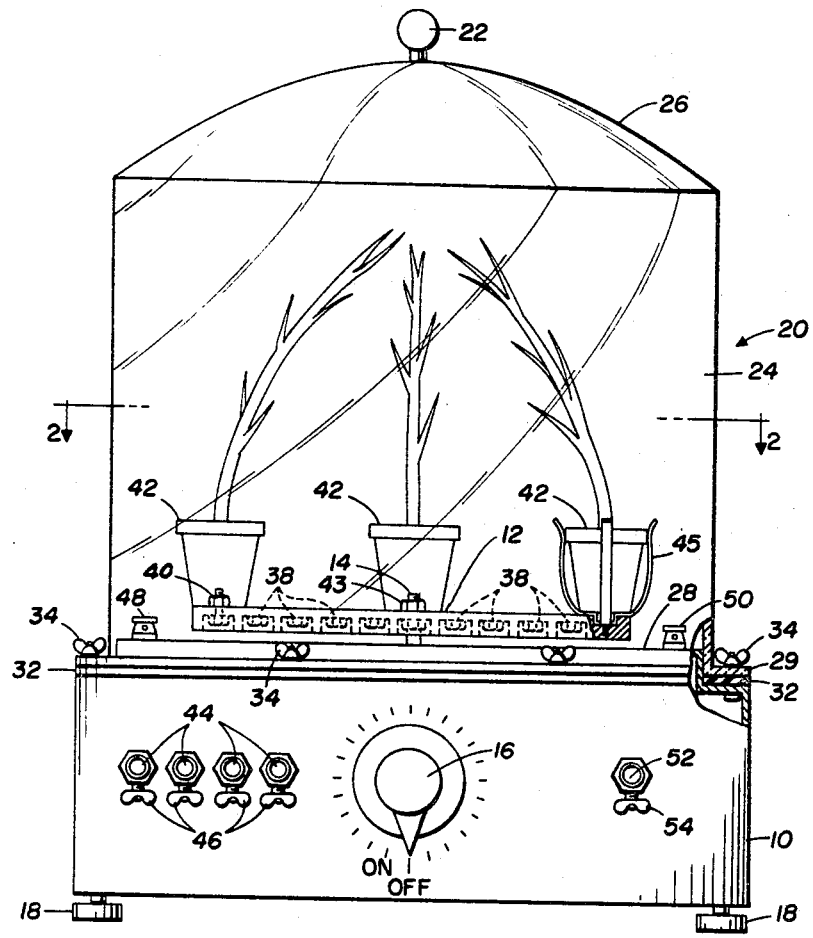

April 30, 1968

C. R. GRANGER 3,380,190

METHOD AND APPARATUS FOR DEMONSTRATING
TROPISTIC PRINCIPLES
Filed March 18, 1965

INVENTOR.
CHARLES R. GRANGER

BY
*James C. Nemmers*

ATTORNEY

United States Patent Office 3,380,190
Patented Apr. 30, 1968

3,380,190
METHOD AND APPARATUS FOR DEMONSTRATING TROPISTIC PRINCIPLES
Charles R. Granger, R.R. 2, Tama, Iowa 52339
Filed Mar. 18, 1965, Ser. No. 440,858
4 Claims. (Cl. 47—58)

This invention relates to a method and apparatus for demonstrating and conducting research in connection with geotropic principles, and more particularly the invention relates to an apparatus and method which is useful in research and demonstrations of the geotropic response exhibited by organisms, such as plants, by creating an artificial stimulus more powerful than the gravitational force of the earth.

All living organisms have tropistic characteristics. In other words, some parts of an organism will undergo involuntary movement in response to certain stimuli. When the tropism exhibited is in the form of response to gravitational attraction, the phenomenon is termed "geotropism." Thus, plants, for example, have geotropic properties in that the roots grow downwardly while the shoots grow upwardly. Other stimuli, such as light, heat, etc., also have an effect on the diretcion of growth, but generally speaking, gravity is the primary orienting factor of plant growth. This basic principle is well known to those skilled in the art and can be proved by various experiments. However, to the student of biology, the natural occurrence of plants oriented by gravity is not enough to prove the point, and to the layman, this phenomenon is not widely known. I have therefore devised a method and apparatus for demonstrating the geotropic response of plants and other living organisms so that this common occurrence can be readily and clearly demonstrated to the student and even to the layman. My novel method and apparatus also is very useful in research conducted with respect to the characteristics of the tropistic phenomenon.

It is therefore an object of my invention to provide a method and apparatus for demonstrating the principle of geotropic response of plants and other living organisms.

It is a further object of my invention to provide a method and apparatus which can be used not only to clearly demonstrate the principle of geotropic response but also to demonstrate the relationships between varied concentrations of atmospheric constituents and their effect on the tropism principle.

It is another object of my invention to provide a method and inexpensive apparatus for carrying out experiments and demonstrations of tropistic principles.

It is a still further object of my invention to provide a method and inexpensive apparatus that can be used in research regarding both known and unknown characteristics of the tropistic phenomenon.

Figure 2:
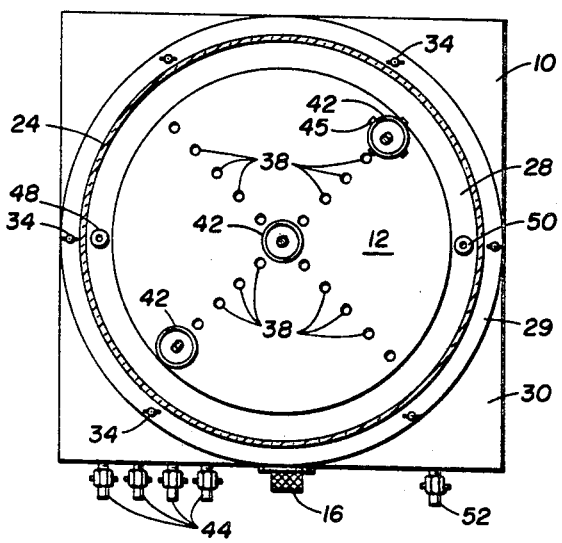

In accordance with these objects and with the principles of my invention, I provide rotatable means upon which there can be mounted appropriate containers for the organisms, such as plants, whose responsiveness it is desired to demonstrate. The containers are then rotated at a speed sufficient to create a force stronger than and at right angles to the gravitational force of the earth. After continuous rotation over a period of time during growth of the organisms, they will exhibit geotropic respnse to the stronger force created by rotation. However, these and other objects and features of my invention will be more readily apparent from a consideration of the following description taken in connection with the accompanying drawings in which:

FIG. 1 is an elevational view of an apparatus constructed according to the principles of my invention; and FIG. 2 is a top view of the apparatus of FIG. 1 and partly in section taken along the line 2—2 of FIG. 1.

Referring now to the drawings, a preferred embodiment of my invention is shown for purposes of illustration. Plants in containers have been shown by way of example in connection with the illustrated apparatus which includes a base of any desired configuration, such as the rectangular base 10 shown in the drawings. The base 10 encloses and houses a motor and suitable drive mechanism (not shown) which power a turntable 12 mounted for rotation about a vertical spindle 14 on top of the base 10. The motor and drive mechanism may be of any suitable type well known to persons skilled in the art and thus further details thereof, which form no part of the invention, will not be described in detail. Preferably, however, means are provided to vary the speed of the turntable 12, such as by use of a rheostat and switch 16 which control the speed of an electric motor, for example. Switch 16 is preferably mounted on the front of the base 10 in a convenient position. The base 10 is also preferably provided with adjustable feet 18 which provide for maintaining the turntable 12 in a level position regardless of irregularities in the surface upon which the base 10 rests.

The turntable 12 is preferably enclosed within a chamber which is defined by the top surface of the base 10 and by a removably mounted transparent glass or plastic cover 20 that has a knob 22 thereon to facilitate ease of removal and replacement. The cover 20 may be of any desired shape, a cylindrical cover having been shown for purposes of illustration. The cover 20 has a sidewall 24 forming a cylinder and a top 26 which may be made separable from the sidewall 24. The cover 20 is open at the bottom to fit around the turntable 12. A correspondingly shaped raised platform 28 may be provided on top of the base 10 beneath the turntable 12, to assist in positioning and sealing the cover 20 with respect to the base 10. The cover 20 preferably has an outwardly extending rim 29 at the bottom edge of sidewall 24 around the entire circumference thereof, the rim 29 facilitating mounting and sealing of the cover 20. The raised platform 28, of course, does not extend to the outside edges of the base 10, and therefore a ledge 30 is formed on the base 10 upon which an annular gasket 32 can be seated. The gasket 32 is interposed between the ledge 30 and the rim 29 of cover 20 which is secured to the base 10 by a plurality of fasteners 34. The gasket 32 may be constructed of any suitable material, such as rubber or plastic, which will provide an airtight seal between the cover 20 and the base 10. As shown, the rim 29 of cover 20 rests upon the gasket 32 and thus a seal is effected between the bottom of cover 20 and ledge 30. If desired, the gasket could be made L-shaped in cross-section so that one leg of the gasket would fit between the raised platform 28 and the inside surface of the cover 20 near its bottom edge. This construction therefore provides an air-tight enclosure inside of which the plants or other organisms to be studied can be mounted.

The turntable 12 is provided with a plurality of openings 38 which are located at different radial distances but which are preferably arranged so that plants can be mounted thereon at diametrically opposed positions and at equal distances from the center of rotation so as to substantially balance the forces when two or more plants are mounted on the turntable 12 and it is rotated. The openings 38 are thus adapted to receive suitable fasteners 40 which provide for securing to the turntable 12 containers such as pots 42, which are also preferably made of transparent material so that the growth of the roots of the plant can be more easily observed. Provision is also preferably made so that a plant container or pot 42 can be secured to the turntable 12 at its axis of rotation. This can be accomplished by extending the spindle 14 above the top surface of the turntable 12 and providing a fastener, such as nut 43, to hold the container in place.

Alternatively to the use of fasteners 40 and 43, a holder 45 can be affixed to the turntable 12 and the plant container set therein. If the holder 45 is resilient, the container can be easily held and removed without the necessity of using fasteners located inside the container, which has certain obvious disadvantages.

Provision for variation in the speed of the turntable 12 and for variable positioning of the pots 42 on the turntable 12 permits application to the plants of different forces. The actual forces created or exerted on the plants in pots 42 when turntable 12 is rotated can be easily computed by the use of appropriate dynamic force equations. As already explained, when the plants in their pots 42 are mounted on the turntable 12 at a distance from the axis of rotation and are rotated at a speed sufficient to create a centrifugal force greater than the gravitational force of the earth, the roots of the plants will grow toward the artificial or created center of gravity, that is, the outside of the turntable 12. Likewise, the shoots of the plants will grow away from the created center of gravity thus appearing to defy the centrifugal force inherent in rotating bodies. A plant that is poistioned with the center of its pot 42 at the axis of rotation of turntable 12 will not be subjected to any appreciable centrifugal force, and thus its shoots and roots will grow substantially vertically. This will clearly illustrate the effect of force on the directional growth of organisms in the absence of other stimuli.

This method and apparatus also permits the determination of the actual strength of the geotropic response of any particular plant, since the geotropic response in any particular plant can be expressed in terms of the force required to produce the desired effect.

I prefer to provide an additional feature in connection with my novel apparatus. On the base 10 there are inlet ports 44 which are manually controlled by valves 46 and which lead to the interior chamber of the apparatus through outlet nozzles 48. This provides for the introduction of air or any other gas into the chamber by connecting inlet ports 44 to a source of supply (not shown) of the desired gas. An outlet port 50 to the chamber is also provided to permit the controlled release of pressure or discharge of gas from the chamber. The outlet port 50 communicates with the outside through a port 52 in base 10 which is also provided with a manually controlled valve 54. Thus, with such an arrangement, it is possible to demonstrate the possible effects of varying concentrations and pressures of air or other gas on the strength, rapidity, or threshold force of the geotropic response of any given specimen.

To summarize, the geotropic principle that is exhibited by living organisms can be demonstrated by subjecting a specimen or specimens of the organism to continuous rotation at a predetermined speed that is sufficient to create a centrifugal force that exceeds the gravitational force of the earth. With this novel method, and using my novel apparatus, the tropistic phenomenon can be studied and the geotropic principle clearly demonstrated and understood even by those untrained in this science. It will be obvious, however, to those skilled in the art that various revisions and modifications can be made in the novel method and apparatus without departing from the spirit and scope of the invention. It is my intention, however, that any such revisions and modifications as are obvious to those skilled in the art will be included within the scope of the following claims.

I claim:

1. An apparatus for demonstrating the geotropic characteristics of living organisms such as plants and the like, said apparatus comprising a base, a member rotatable above said base about a vertical axis, means for securing growing plant to said member at varied distances from its center of rotation and at its center of rotation, a cylindrical shaped transparent cover removably supported on said base and enclosing said rotatable member while providing for an unobstructed view from all sides of a plant secured to said rotatable member, means for removably securing said cover to said base and providing an airtight seal therebetween, means for variably controlling the speed of said rotatable member, means for admitting gases into and discharging gases from the airtight enclosure formed by said base and cover, and means for controlling the pressure within said enclosure.

2. A method of demonstrating the geotropic characteristics of living organisms, such as plants and the like, comprising the steps of providing an environment in which said plants can grow; and causing said plants to follow a circular path in a substantially horizontal plane continuously during an extended period of visible growth of said plants, the speed of said plants in said path being sufficiently high to create centrifugal force on said plants that at least attains the threshold stimulus of geotropic response of said plants, whereby the shoots of said plants will grow toward the rotative axis of said path and the roots away from said axis.

3. A method of demonstrating the geotropic characteristics of a living organism, such as a plant or the like, comprising the steps of: planting said plant in a container suitable for its growth; mounting said container and plant on means rotatable about a substantially vertical axis and at a distance from said axis; rotating said container and plant on said means at a speed sufficiently high to create centrifugal force on said plant that at least attains the threshold stimulus of geotropic response of said plant; and providing an environment in which said plant can grow while continuing to rotate said plant at said speed during a period of visible growth of said plant whereby the shoots of said plant will grow toward said axis of rotation and the roots of said plant away from said axis.

4. A method of demonstrating the geotropic characteristics of living organisms, such as plants and the like, comprising the steps of: providing containers suitable for growth of plants therein; mounting a first container having a plant growing therein on means rotatable about a substantially vertical axis at a distance from said axis; mounting a second container having a plant growing therein on said rotatable means directly over said axis of rotation; rotating said means and said first and second containers at a speed sufficient to create a centrifugal force on said first container and its plant that at least attains the threshold stimulus of geotropic response of the plant in said first container; and providing an environment in which said plants can grow while continuing to rotate said means at a speed during a period of visible growth of said plants whereby the shoots of the plant in said first container will grow toward the axis of rotation and the roots of the plant in said first container will grow away from said axis; and observing and comparing the direction of growth of the shoots and roots of the plant in said first container with those in the second container.

References Cited

C-1-B Rotary Accelerator, Schaevitz Machine Works, Data Sheet E-17, received in Div. 36 on Nov. 6, 1961, copy in Cl. 73-1DC, Data Sheet E-17 received on.

ROBERT E. BAGWILL, *Primary Examiner.*